3,111,495
PLASTIC CONDUCTOR COMPOSITION
Augustine C. Murphy, Framingham, and Thomas J. Murphy, Hudson, Mass. (both % Abbey Plastic Corp., 420 Main St., Hudson, Mass.)
No Drawing. Filed Apr. 14, 1959, Ser. No. 806,215
1 Claim. (Cl. 252—511)

This invention relates to an electrically conducting plastic composition containing an emulsion polymerized poly-vinyl chloride, a plasticizer, and an oil furnace black. Rubber and vinyl compositions are known which contain natural rubber or synthetic elastomers and are loaded with carbon black or acetylene black pigments, but these are only semi-conductors.

It is known that rubber conductors are very difficult to make with uniform conductivity, and the prior art vinyl chloride semi-conductors could only be made with relatively high resistivity, e.g., in the nature of 142 ohms-centimeter, and this renders them incapable of use as wires and similar conductors; they have been proposed in the past as shields and mats, although in actual practice they have been used little if any.

It is the principal object of the present invention to provide a composition including a poly-vinyl chloride resin in conjunction with a poly-vinyl chloride plasticizer and a furnace black which will provide resistivity down to 1 ohm-centimeter, and which may still be utilized in an elongated resilient elastic form of high tensile strength in the same manner as copper wires under many conditions, and particularly under conditions of relatively high voltage as in automobile ignitions, etc.

It has been found that the relative amount of the plasticizing agent provides for a greater or less degree of resistivity. The more plasticizer there is used, the less the conductance, and therefore the stiffer the composition becomes, the more conductive it is.

However, the present invention provides a perfectly flexible elastic conductor of relatively high conductivity, i.e., in the nature of having a resistivity of but one ohm per centimeter and as much greater as may be desired; and in general the object of the invention is to provide such a conductive plastic composition in a range of one to eleven ohms per centimeter of resistivity, the composition being elastic, flexible, tough and resilient.

The composition comprehended under this invention may be in organasol, plastisol, or water dispersion liquid form for coating, spraying or painting, it may be molded under compression or injection, it may be pressed, cast, dip-coated, molded and extruded and laminated, etc.

As an example of the invention, the following composition has been made and used commercially in quantity:

| | Percent |
|---|---|
| (1) An emulsion polymerized poly-vinyl chloride | 27.49 |
| (2) Butyl benzyl phthalate | 32.30 |
| (3) Cadmium barium stabilizer (with organic inhibitor) | 0.70 |
| (4) Polymeric epoxy | 1.38 |
| (5) Calcium stearate | 0.34 |
| (6) Mineral oil | 1.02 |
| (7) Large particle (oil) furnace black | 36.77 |

Obviously the percentages above may be varied within wide limits. The amount of plasticizer and black may be varied from 15 to 50% to provide for a stiffer or more flexible composition, and the vinyl from 20–40%, but the example given above is one which provides a perfectly acceptable flexible, tough, resilient and elastic electric conductor. The butyl benzyl phthalate is used as a plasticizer and the cadmium barium is the stabilizing agent, together with the polymeric epoxy. Calcium stearate and mineral oil are used for lubricants. These minor ingredients may also be varied in small degree.

The plasticizer, stabilizing agents and lubricants are of a type well known in the polymer art, and particularly in connection with the polymerization of vinyl resins. The function of the barium cadmium and epoxy stabilizers in such resins is described, for example, in Organic Protective Coatings by Von Fischer and Bobalek, published by Reinhold Publishing Corporation, 1953, pages 196–201. See Also Epoxy Resins by Irving Skeist, published by Reinhold Publishing Corporation, 1958, pages 4 and 5. Polymer lubricants are referred to in Polymer Processes by Schildknecht, Interscience Publishers, 1956, pages 685 et seq. The use of organic inhibitors in such polymers is also well known and is described in the same book, pages 771 and 772.

It has been found that the materials in more or less the percentages given above provide for extremely good commercial results, particularly for use in extruded form, as current-carrying wires and the like. The compound is thermo-plastic and the resistivity values are controllable, by variation in the percentages of the above example, allowing specific application requirements. The electrical characteristics are uniformly distributed and can be easily reproduced. The following table gives the physical properties of the above-described composition in the percentages shown:

| | |
|---|---|
| Resistivity (ohm-cm.) | 11 |
| Tensile strength (p.s.i.) | 1500 |
| Modulus at 100% elongation (p.s.i.) | 1450 |
| Elongation (percent) | 125 |
| Cold bend (50 mil slab—180° bend—½″ mandril) ° C | −40 |
| Durometer (Shore A) | 88 |
| Specific gravity | 1.39 |

Further test results are shown below, particularly with respect to relative thickness of tape made from the composition:

ASTM D-991

[Temperature—Room]

| | Thick. (mils) | Resistance (ohms/cm.³) | | |
|---|---|---|---|---|
| | | Max. | Min. | Ave. |
| Extruded Tape | 15 | 4.45 | 4.09 | 4.24 |
| Calendered Tape | 6 | 10.19 | 7.14 | 8.54 |
| Calendered Tape (length) | 10 | 6.71 | 5.31 | 5.92 |
| Calendered Tape (cross) | 10 | 4.59 | 3.85 | 4.24 |

ASTM D-257

[Temperature—Room]

| | Thick. (mils) | Max. | Min. | Ave. |
|---|---|---|---|---|
| Extruded Tape | 15 | 7.34 | 6.87 | 7.02 |
| Calendered Tape | 6 | 15.48 | 10.48 | 12.96 |
| Calendered Tape (length) | 10 | 9.44 | 7.98 | 8.49 |
| Calendered Tape (cross) | 10 | 8.0 | 6.42 | 7.02 |

10% ELONGATION

| | Thick. (mils) | Max. | Min. | Ave. |
|---|---|---|---|---|
| Extruded Tape | 15 | 6.37 | 5.58 | 5.87 |
| Calendered Tape | 6 | 7.28 | 5.23 | 6.04 |
| Calendered Tape (length) | 10 | 4.85 | 4.56 | 4.69 |
| Calendered Tape (cross) | 10 | 12.27 | 11.65 | 12.00 |

This composition has been used as a replacement of the copper braid in communications wire; as conductors for ignition wire; and also in all kinds of shielding, particularly on microphone cable, and as shielded wire for coaxial cables. Among the advantages are superior shielding characteristics, with mechanical noise being reduced in microphone cable, and with proper cord and outside insulation it makes a superior wire for an ignition wire, reducing corona and radio interference and improving the spark.

The composition may be used in many other applications, particularly as a semi-conductor in warming pads and deicing applications for aircraft, high voltage conductor shielding, capsulation devices as in transformers, and anti-static devices.

It has been found that the emulsion type poly-vinyl chloride is particularly adapted to provide the compound with a lower di-electric characteristic, with better tensile strength and better elongation characteristics; and it has also been found that a large particle oil furnace black, which may be of crystal-type and is relatively coarse as compared to a finely divided carbon black, also helps to provide for the more advantageous characteristics recited. In general, the same thing is true of the butyl benzyl phthalate which has been found to provide a more highly solvating action and is more highly absorbent than prior art plasticizers and has a lower or poorer di-electric characteristic.

Having thus described our invention and the advantages thereof, we do not wish to be limited to the details herein disclosed, otherwise than as set forth in the claim, but what we claim is:

An electricity-conducting thermo-plastic composition having a resistivity of about 11 (ohm-cm.) consisting essentially of polyvinyl chloride, a polyvinyl chloride plasticizer, and large particle oil furnace black together with small quantities of polyvinyl chloride lubricant and stabilizers in approximately the following proportions:

(1) an emulsion polymerized polyvinyl chloride about 27%,
(2) butyl benzyl phthalate about 32%, as a plasticizer,
(3) lubricant about 1.5%,
(4) large particle oil furnace black about 37%, and
(5) stabilizer not to exceed about 3% of the total composition.

References Cited in the file of this patent

UNITED STATES PATENTS

| | | |
|---|---|---|
| 2,020,085 | Smith et al. | Nov. 5, 1935 |
| 2,041,213 | Schellenger et al. | May 19, 1936 |
| 2,446,387 | Peterson | Aug. 3, 1948 |
| 2,473,183 | Watson | June 14, 1949 |
| 2,683,669 | Coler | July 13, 1954 |
| 2,888,424 | Precopio et al. | May 26, 1959 |
| 2,997,451 | Miller | Aug. 22, 1961 |

FOREIGN PATENTS

| | | |
|---|---|---|
| 741,738 | Great Britain | Dec. 14, 1955 |
| 497,764 | Canada | Nov. 17, 1953 |
| 470,380 | Great Britain | Aug. 13, 1937 |

OTHER REFERENCES

Schildknecht: Polymer Processes, Interscience Pub. Co., New York and London, 1956, pages 111, 545, 546, 564, and 565.

"Today's Furnace Blacks," by Drogin and Bishop, publication by United Carbon Company, Inc., Charleston, W. Va., 1948, page 36.